Sept. 4, 1956
F. C. GOSSETT
2,761,264
APPARATUS FOR FORMING, FILLING AND
SEALING PLASTIC CONTAINERS
Filed Jan. 12, 1952
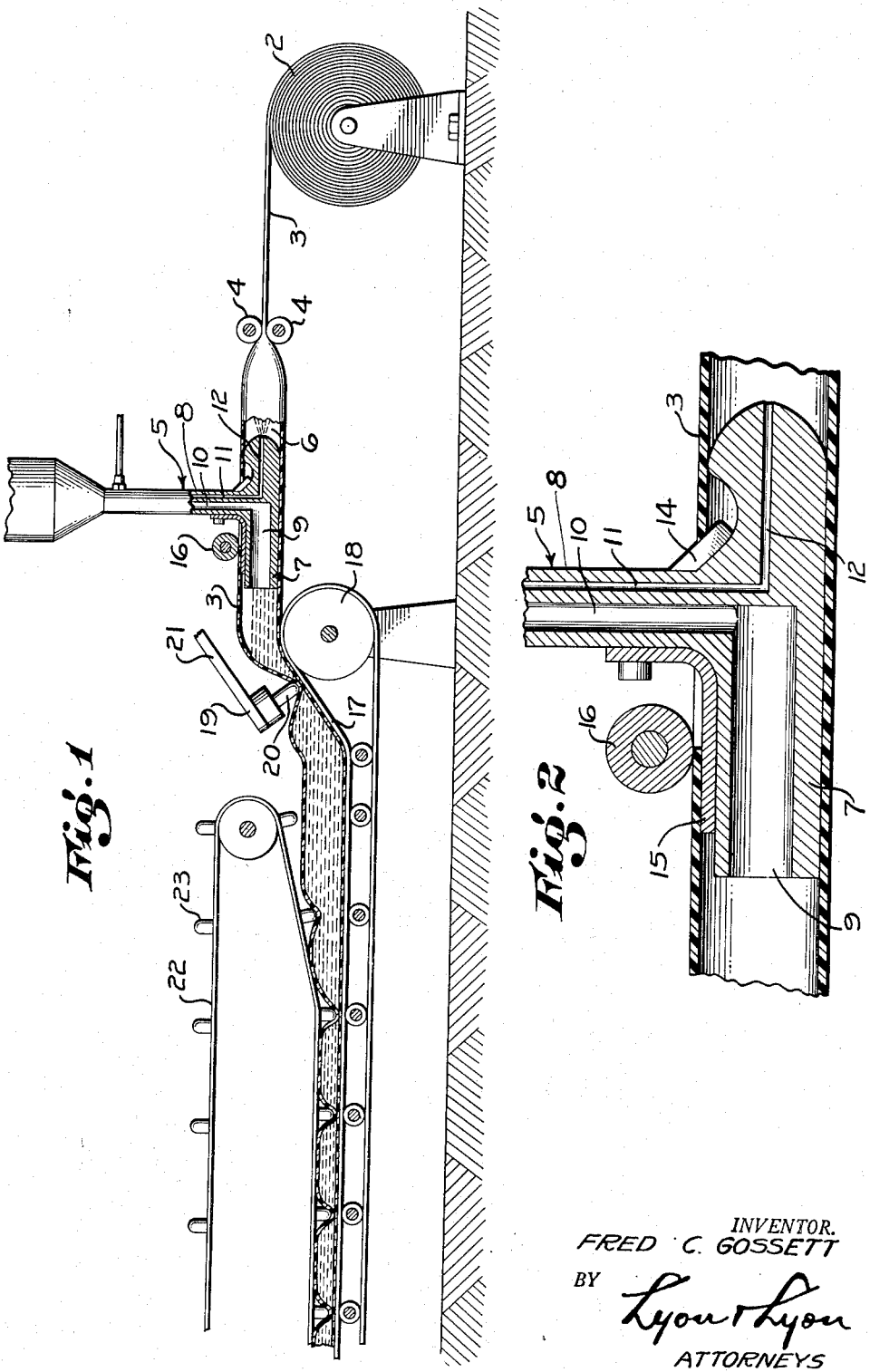
INVENTOR.
FRED C. GOSSETT
BY
Lyon & Lyon
ATTORNEYS

United States Patent Office 2,761,264
Patented Sept. 4, 1956

2,761,264

APPARATUS FOR FORMING, FILLING, AND SEALING PLASTIC CONTAINERS

Fred C. Gossett, Glendale, Calif., assignor to Don Baxter, Inc., Glendale, Calif., a corporation of Nevada Application January 12, 1952, Serial No. 266,161

10 Claims. (Cl. 53—180)

This invention relates to an apparatus for forming, filling and sealing plastic containers, and refers particularly to an apparatus by which, in a continuous process, a continuous tubing is taken, filled with material, generally liquid, subdivided into suitable lengths which are sealed and separated into individual containers. Thus in accordance with the apparatus of the present invention, the containers for liquids are sealed and produced simultaneously in a continuous process from a continuously advancing tube.

The apparatus of the present invention is of particular value for the production of containers filled with pharmaceutical products, such as intravenous solutions. In the filling of containers with pharmaceutical products dirt and contamination must be kept at the minimum. Prior apparatus has been devised by which one starts with a roll of flat plastic film which is automatically folded and sealed into a container and filled with a liquid or solid product. But in such an apparatus there is opportunity for contamination. In accordance with the present invention the starting material is in the form of a flat tubing. Tubings of material can be extruded so as to be absolutely clean and sterile on their inner surfaces and can be stored so as to remain sterile and clean until time of filling.

By means of the present invention an apparatus is provided by which such sterile, clean tubing can be filled and sealed in a continuous manner producing individually sealed containers while maintaining sterile conditions and avoiding chance of contamination.

By the apparatus of the present invention it is possible to take a sterile plastic tubing, introduce sterile solution of pharmaceutical products into the same, subdivide the tubing into individual sealed containers, while maintaining such sterile conditions, and separate the individually formed and filled containers.

While the apparatus of the present invention is capable of thus producing containers of sterile products, it is, of course, possible with the apparatus of the present invention to fill the same with unsterile solution or to use unsterile tubing and thereafter subject the produced and filled containers to a sterilizing treatment such as might be carried out in the usual sterilizing autoclave.

The aparatus of the present invention, together with various further objects and advantages of the invention will be more fully understood from the following description of the preferred form of the invention, the description being given in connection with the accompanying drawings, in which:

Figure 1 is a diagrammatic elevation of the apparatus partially in vertical section, and Figure 2 is an enlarged fragmentary elevation mainly in vertical section of the splitting, filling and heat-sealing unit of the apparatus.

Referring to the drawings, the apparatus of the present invention includes a reel 2 upon which is wound a roll of layflat plastic tubing 3, preferably of the type which has been extruded so as to possess a clean, sterile inner surface. This layflat plastic tubing 3 is withdrawn from the reel 2 by a pair of pinch rollers 4, which serve not only as a means for withdrawing the plastic tubing 3 from the reel 2 but also as a means to form a seal for one end for an airpocket. From the pinch rollers 4 the tubing 3 passes to a slitting and filling element 5, and between the element 5 and the pinch rollers 4 the tubing 3 is expanded by air forming the airpocket 6. The slitting and filling device 5 comprises a shoe 7 which is joined with an entrance section 8. The shoe section of the device at the end remote from the pinch rollers 4 should have an external circumference approximating that of the internal circumference of the plastic tubing 3. This shoe portion provides a hollow passage 9 open at the left end as viewed in the drawing for discharge of liquid which is to be used for filling the produced containers. This hollow passage 9 joins with one of reduced size 10 extending through the inlet section 8, which leads to a source (not shown) of the liquid to be filled. There is also provided a narrow passage 11 leading to a source of air under pressure which joins with the bore 12 which discharges air into the chamber 6 formed by the tube between the unit 5 and the pinch rollers 4. At the end of the slitting device 5 facing the pinch rollers 4 there is provided an upward and rearward slanting blade 14 in position to contact the upper wall of the tubing 3 as it passes the blade 14. This blade 14 in operation acts to form a slit in the tubing 3 permitting the entrance into that tubing of the filling solution and also the air used to confine the filling solution to the section of tubing beyond the slitting device. A slit is formed by the blade 14 in the tubing, which slit is, however, permitted to extend only for a few inches along the length of the tubing because immediately after the tubing passes the inlet section 8 of the filling device the tubing encounters a heating electrode 15 and a heat sealing wheel or bar 16 which operates to reseal the tubing closing the seal formed at the knife blade 14. The shoe 7 of the filling device not only serves as a conduit for the entering solution but also as a means of positioning the tubing for action by the sealer.

From the filling and slitting device 5 the tubing is now filled, or partially filled, with solution, and then passed to a conveyor 17, one end of which passes over a roller 18. In order to assist the transfer of the tubing to the conveyor in certain cases it is desirable to subject the tubing 3 as it passes over the roller 18 to a step-by-step operation of pressing the tubing against said roller and conveyor 17 and pushing the tubing in the intended direction of travel. For this purpose there is indicated a hitch feed device 19 which has the rounded contact member 20 for engaging the tubing, pressing the same against the roller 18 and the handle 21 by means of which the same, as a unit, is forced in the direction of movement of the tubing 3. The hitch feeder may, in practice, be mechanically operated by means not shown in a step-by-step manner.

While passing on the conveyor 17 the tubing 3, now containing the solution, passes into contact with a traveling sealing element diagrammatically indicated at 22. Devices for taking a sealed tubing and separating the tubing into individual sealed containers are well known, therefore the sealer 22 is but diagrammatically illustrated. It comprises a succession of elements 23 which come into contact with the tubing 3 on the conveyor 17 to press the portions of the tubing in contact with the elements 23 into the form of a flat tubing and sealing the tubing at such point, thereby forming between the sealing elements 23 individual filled containers which may be severed from each other in any desired or preferred manner. The same apparatus that provides for heat sealing the unit containers may include various other desired devices, not shown, for labeling, adding pads, etc., to the produced containers.

By means of the apparatus of the present invention it is possible to produce sealed containers without exposing the inside of the container to unsterile air and one avoids the necessity of washing the interior of the produced containers. By the use of different dimensional shoes on the slitting and filling element 5 it is possible to make various changes in the dimensions of the containers produced.

This invention is of the scope set forth in the appended claims.

I claim:

1. An apparatus for producing and filling containers continuously, or intermittently, which comprises, means for continuously advancing a layflat tubing, means for expanding the tubing while the same is advancing and for filling the tubing, said means including a shoe partially located within the expanded tubing and having a slitting blade and a heat sealer, a passage in said shoe for introducing solution into the expanded shoe, a passage in said tubing for introducing air to maintain a portion of said tubing expanded in front of the slitting blade, and means for dividing and sealing the filled tubing into individual containers.

2. An apparatus for filling and forming containers, a pair of pinch rollers for advancing a layflat plastic tubing, a tube filling and slitting unit by which the tubing is advanced, said unit comprising, a partially located shoe within the expanded tubing and having on its forward side a tube slitting blade and having at its rearward side means for sealing the slit formed in the tubing by said tube slitting blade, such shoe having a transverse extending portion providing an inlet passage for a solution to the interior of the tubing through said shoe, said transverse portion also including an air passage for delivering air and for expanding the tubing in front of the slitting blade.

3. An apparatus for filling and forming containers, a pair of pinch rollers for advancing a layflat plastic tubing, a tube filling and slitting unit by which the tubing is advanced, said unit comprising, a shoe having on its forward side a tube slitting blade and having at its rearward side means for sealing the slit formed in the tubing by said tube slitting blade, such shoe having a transverse extending portion providing an inlet passage for a solution to the interior of the tubing through said shoe, said transverse portion also including an air passage for delivering air and for expanding the tubing in front of the slitting blade, said shoe having a cross-sectional area, the periphery of the shoe in places transverse to the direction of travel of the tubing being substantially equal to the inner periphery of the layflat tubing.

4. An apparatus for filling and sealing flexible containers which comprises, means for advancing flexible layflat tubing from a reel, said means including pinch type flat guide rolls, means for inflating a portion of the tubing as it is advanced beyond the pinch type guide rolls, a sizing and forming shoe over which the inflated tubing travels, said sizing and forming shoe having a tube slitting blade and a sealing means for sealing the slit formed in the tubing, and an inlet section on the sizing and forming shoe passing through the slit of the advancing tubing, said inlet section including means for introducing solution into the advancing tubing, said means for inflating a portion of the tubing being included in part in said inlet section.

5. An apparatus for producing and filling containers continuously or intermittently which comprises, means for continuously advancing a layflat tubing, means for expanding the tubing while the same is advancing and for filling the tube, said means including a shoe partially located within the expanded tubing and having a slitting blade and a heat sealer, a passage in said shoe for introducing solution into the expanded tubing, a passage in said tubing for introducing fluid to maintain a portion of said tubing expanded in front of the slitting blade, and means for dividing and sealing the filled tubing into individual containers.

6. An apparatus for filling and forming containers, a pair of pinch rollers for advancing a layflat plastic tubing, a tube filling and slitting unit by which the tubing is advanced, said unit comprising, a shoe partially located within the expanded tubing and having on its forward side a tube slitting blade and having at its rearward side means for sealing the slit formed in the tubing by said tube slitting blade, such shoe having a transverse extending portion providing an inlet passage for a solution to the interior of the tubing through said shoe.

7. An apparatus for filling and sealing flexible containers which comprises, means for advancing flexible layflat tubing from a reel, means for inflating a portion of the tubing as it is advanced, a sizing and forming shoe over which the inflated tubing travels, said sizing and forming shoe having a tube slitting blade and sealing means for sealing the slit formed by said blade, and an inlet section attached to said shoe passing through the slit formed in the advancing tubing, said inlet section including passages for introducing fluids.

8. An apparatus for filling and sealing flexible containers which comprises, means for advancing flexible tubing from a reel, means for inflating a portion of the tubing as it is advanced, a shoe over which the inflated tubing travels, means for slitting the expanded tubing as the tubing advances, means for sealing the slit in the tubing as the tubing further advances, and an inlet section attached to the shoe passing through the slit of the advancing tubing, said inlet section including means for introducing solution into the advancing tubing.

9. An apparatus for filling and sealing flexible containers which comprises, means for advancing flexible tubing from a reel, means for inflating a portion of the tubing as it is advanced, a shoe over which the inflated tubing travels, means for slitting the tubing as the tubing advances, means at least partially located on said shoe for lap-sealing the slit in the tubing as the tubing further advances, and an inlet section attached to the shoe passing through the slit of the advancing tubing, said inlet section including means for introducing solution into the advancing tubing.

10. An apparatus for producing and filling containers which comprises, means for advancing a layflat tubing, means for expanding the tubing while the same is advancing and for filling the tubing, said means including a shoe partially located within the expanded tubing, a passage in said shoe for introducing a solution into the expanded tubing, a passage in said shoe for introducing fluid to maintain a portion of said tubing expanded in front of said shoe, a slitting blade located at said shoe and a lap-sealer for sealing the slit formed by said blade located in advance of the introduction of solution, and means for dividing and sealing the tubing into individual containers.

References Cited in the file of this patent

UNITED STATES PATENTS

| | | |
|---|---|---|
| 2,387,812 | Sonneborn | Oct. 30, 1945 |
| 2,616,232 | Meyer | Nov. 5, 1952 |